United States Patent
Purinton et al.

(10) Patent No.: US 8,262,270 B1
(45) Date of Patent: Sep. 11, 2012

(54) SYSTEM AND METHOD FOR PROVIDING VISUAL AND AUDIO ALERTS AND CARGO CAPACITY ON A PERSONAL TRANSPORTER

(75) Inventors: David Purinton, Spanish Fork, UT (US); Alex Purinton, Spanish Fork, UT (US); Shayne Ashton, West Jordan, UT (US); Gary Sivertsen, Salem, UT (US); Mary Sivertsen, Salem, UT (US); Bryan Perry, Spanish Fork, UT (US)

(73) Assignee: Consultus, LLC, Spanish Fork, UT (US)

( * ) Notice: Subject to any disclaimer, the term of this patent is extended or adjusted under 35 U.S.C. 154(b) by 407 days.

(21) Appl. No.: 12/566,546

(22) Filed: Sep. 24, 2009

Related U.S. Application Data (60) Provisional application No. 61/099,907, filed on Sep. 24, 2008.

(51) Int. Cl.
*F21V 33/00* (2006.01)
*F21V 29/00* (2006.01)
(52) U.S. Cl. .......................... 362/506; 362/544; 362/546
(58) Field of Classification Search .......... 362/463–479, 362/459, 487, 492, 493, 512, 505, 506, 543–546
See application file for complete search history.

(56) References Cited

U.S. PATENT DOCUMENTS

| | | | |
|---|---|---|---|
| 6,276,822 B1 * | 8/2001 | Bedrosian et al. | 362/545 |
| 6,550,950 B1 * | 4/2003 | Fernandez | 362/545 |
| 6,619,829 B1 * | 9/2003 | Chen | 362/544 |
| 6,842,110 B2 * | 1/2005 | Quigley et al. | 340/468 |
| 6,879,263 B2 * | 4/2005 | Pederson et al. | 340/815.45 |
| 7,059,754 B2 * | 6/2006 | Lekson et al. | 362/545 |
| 7,589,622 B2 * | 9/2009 | Farley | 340/468 |
| 2004/0156205 A1 * | 8/2004 | Pisciotti | 362/485 |
| 2005/0111231 A1 * | 5/2005 | Crodian et al. | 362/545 |
| 2010/0141153 A1 * | 6/2010 | Recker et al. | 315/149 |
| 2010/0149073 A1 * | 6/2010 | Chaum et al. | 345/8 |
| 2012/0080944 A1 * | 4/2012 | Recker et al. | 307/25 |

* cited by examiner

*Primary Examiner* — John A Ward
(74) *Attorney, Agent, or Firm* — Steven L. Nichols; VanCott, Bagley, Cornwall & McCarthy P.C.

(57) ABSTRACT

A system and method for providing added functionality to a personal transporter by way of adding increased lighting, sound, and cargo carrying options is described. The system can include front, side, and rear lighting and an audio alert system. The system can further include flatbed structures for carrying hazardous or other materials, as well as cargo organizing systems for carrying supplies and equipment.

22 Claims, 10 Drawing Sheets

SYSTEM AND METHOD FOR PROVIDING VISUAL AND AUDIO ALERTS AND CARGO CAPACITY ON A PERSONAL TRANSPORTER

CROSS-REFERENCE TO RELATED APPLICATIONS

This application claims the benefit of U.S. Provisional Application No. 61/099,907, filed Sep. 24, 2008, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not applicable.

BACKGROUND OF THE INVENTION

Personal transporters have become increasingly popular and widely used. They are being used in the private and public sectors with broad ranges of applications. They are being used with increasing regularity by public departments, for example by emergency personnel. The most popular example of a personal transporter is made by Segway, Inc. In an emergency, every second counts, and maneuvering through a crowd takes extra time. A personal transporter, with the ability to negotiate tight spaces gets emergency personnel where they need to be and at greater speeds. Riding off of the ground gives emergency personnel the advantage of viewing and assessing the scene much earlier and as they approach.

Current iterations offer little by way of lighting options and sound alert options, leaving the emergency personnel to use voice commands, or use inadequate lighting products to try to gain recognition in a usually hectic environment. Often bystanders and onlookers are so affected by what is happening that they hinder emergency personnel from getting into proper position for action by standing in the way. Because personal transporters move at a much greater speed than a pedestrian walks, and because they can operate at such low sound levels, average pedestrians may not notice the approaching emergency worker.

Personal transporters currently offer little by way of cargo carrying capacity. Many may have standard side bags that limit the size and shape of items that can go inside them. For example, an emergency worker may arrive on the scene of an accident to find that some large oddly shaped item needs to be transported away from the area. The current iteration of personal transporter cargo holds would be limiting in this situation, leaving personnel to either remove the item by hand, bring in a second standard type vehicle, or leave the item where it lies. In a situation where the item is dangerous leaving it where it is may not be an option. Moving it on foot may be too slow and waiting for a second vehicle may also take too long. Additionally, handling of the item may be dangerous and as such placing the item into a side bag may require too much handling.

The prior art is thus characterized by several disadvantages that are addressed by the present disclosure. The present disclosure minimizes, and in some aspects eliminates, the above-mentioned failures, and other problems, by utilizing the methods and structural features described herein.

With the limitations noted above, what is needed is a system that makes personal transporters more usable to emergency and security personnel by providing increased lighting and sound alert options in addition to more effectual cargo handling characteristics. One of the key advantages of a personal transporter is that it has a small footprint and any additions should compliment this minimal footprint. In an emergency situation where cargo should be moved, the addition of a cargo carrying surface would aid service workers in handling odd sized or dangerous materials. A tray configuration may be useful for providing a carrying surface as well as providing a platform for work lighting or signal lighting.

The features and advantages of the invention will be set forth in the description that follows, and in part will be apparent from the description, or may be learned by the practice of the embodiments without undue experimentation. The features and advantages of the embodiments may be realized and obtained by means of the elements and combinations particularly pointed out in the appended claims.

BRIEF SUMMARY OF THE INVENTION

An illustrative embodiment of the present invention comprises a system for providing visual and audio alerts on a personal transporter, the system comprising:

a light bar assembly disposed on the personal transporter, the light bar assembly comprising a bracket and a forward-facing light, a side-facing light, and a rear-facing light, wherein each of said forward-facing light, side-facing light, and rear-facing light is disposed on the bracket;

a user control panel disposed on the personal transporter and electrically connected to the forward-facing, side-facing, and rear-facing lights;

a light housing assembly disposed on the personal transporter and electrically connected to the user control panel, the light housing assembly having a head light, a signal light, and an audio alert system disposed thereon; and means for supplying electrical power to said control panel, forward-facing light, side-facing light, rear-facing light, head light, signal light, and audio alert system.

The user control panel can comprise a wireless transmitter and a wireless receiver that is electrically connected to the forward-facing light, side-facing light, rear-facing light, head light, signal light, and audio alert system. Further, the user control panel may be configured for activating the forward-facing light, side-facing light, and rear-facing light in one or more predetermined patterns. The forward-facing light may be configured for emitting white light and the side-facing and rear-facing lights may be configured for emitting colored light. The forward-facing light, side-facing light, rear-facing light, head light, and signal light may comprise light emitting diodes. The light emitting diodes may be configured for emitting a plurality of colors of light. Further, the light emitting diodes may be clustered into pluralities of light emitting diodes.

In another illustrative embodiment of the invention wherein the personal transporter comprises one or more side bags, the system further comprises a side bag organizer configured for being transported in the one or more side bags, the side bag organizer comprising:

a housing comprising a first portion and a second portion joined to each other by a flexible connector, the housing defining an inner compartment;

a zipper disposed on the first portion and the second portion for permitting releasable sealing of the inner compartment;

at least one handle disposed on the first portion or the second portion or on both the first portion and second portion;

at least one container sized and shaped to fit within the inner compartment, the at least one container further comprising a transparent portion for viewing contents of the container.

Still another illustrative embodiment of the present invention comprises a system for providing light and cargo carrying capacity on a personal transporter, the system comprising:

a tray system disposed on the personal transporter, the tray system comprising
  a tray platform comprising a substantially horizontal surface and comprising front and side edges,
  a plurality of light bars, each comprising a bracket having a work light disposed thereon, the plurality of light bars disposed adjacent to the front and side edges of the tray platform;
a user control panel disposed on the personal transporter and electrically connected to the work light of each of the plurality of light bars; and
means for supplying electrical power to the user control panel and each work light.

The tray platform may comprise a retainer wall disposed adjacent to the front and side edges. The system may further comprise:

a light housing assembly disposed on the personal transporter, the light housing assembly having a head light, a signal light, and an audio alert system disposed thereon;
wherein the head light, the signal light, and the audio alert system are electrically connected to the user control panel and the means for supplying electrical power.

The user control panel may comprise a wireless transmitter, and a wireless receiver may be electrically connected to each work light. The plurality of work lights, the head light, and the signal light may comprise light emitting diodes. The light emitting diodes may be configured for emitting a plurality of colors of light, and the light emitting diodes may be clustered into pluralities of diodes.

Another illustrative embodiment of the invention comprises a system for providing visual and audio alerts on a personal transporter, the system comprising:

a light housing assembly disposed on the personal transporter, the light housing assembly having a head light, a signal light, and an audio alert system disposed thereon;
a user control panel disposed on the personal transporter and electrically connected to the head light, the signal light, and the audio alert system; and
means for supplying electrical power to the user control panel, head light, signal light, and audio alert system.

The user control panel may comprise a wireless transmitter, and a wireless receiver may be electrically connected to the head light, signal light, and audio alert system. The user control panel may also be configured for activating the signal light in one or more predetermined pattern. The forward-facing light may be configured for emitting white light and the side-facing and rear-facing lights may be configured for emitting colored light. The forward-facing light, side-facing light, rear-facing light, head light, and signal light may comprise light emitting diodes. The light emitting diodes may be configured for emitting a plurality of colors of light. The light emitting diodes may be clustered into pluralities of diodes.

Still another illustrative embodiment of the present invention comprises a system for providing visual alerts on a personal transporter, the system comprising:

a light bar assembly configured for being disposed on the person transporter, the light bar assembly comprising a bracket and a forward-facing light, a side-facing light, and a rear-facing light, wherein each of said forward-facing light, side-facing light, and rear-facing light is disposed on the bracket; and
a user control panel configured for being disposed on the personal transporter and electrically connected to the forward-facing, side-facing, and rear-facing lights.

Yet another illustrative embodiment of the present invention comprises a system for providing audio and visual alerts on a personal transporter, the system comprising:

a light housing assembly configured for being disposed on the personal transporter, the light housing assembly having a head light, a signal light, and an audio alert system disposed thereon;
a user control panel configured for being disposed on the personal transporter and electrically connected to the head light, the signal light, and the audio alert system.

A still further illustrative embodiment of the present invention comprises a tray system for a personal transporter, the tray system comprising:

a tray platform configured for being disposed on the personal transporter, the tray system comprising a substantially horizontal surface, front and side edges, and a plurality of light bars, each of the plurality of light bars comprising a bracket having a work light disposed thereon, the plurality of light bars disposed adjacent to the front and side edges of the tray platform; and
a user control panel configured for being disposed on the personal transporter and electrically connected to the work light of each of the plurality of light bars.

BRIEF DESCRIPTION OF THE SEVERAL VIEWS OF THE DRAWINGS

The features and advantages of the disclosure will become apparent from a consideration of the subsequent detailed description presented in connection with the accompanying drawings in which.

DETAILED DESCRIPTION

For the purposes of promoting an understanding of the principles in accordance with the disclosure, reference will now be made to the embodiments illustrated in the drawings and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the claims.

Figure 1:
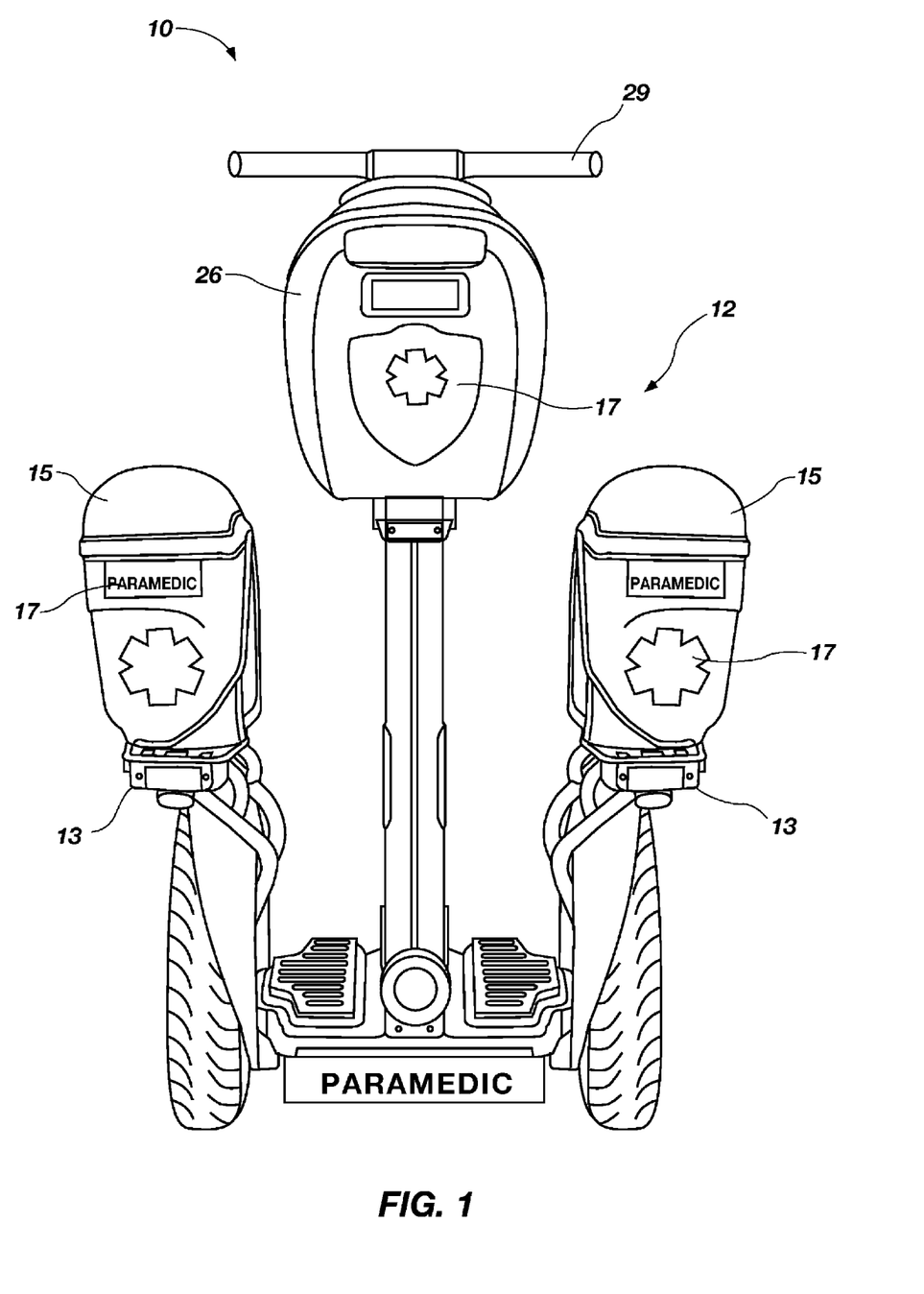
FIG. 1 is a front view of a personal transporter according to an illustrative embodiment of the present invention.
Figure 2:
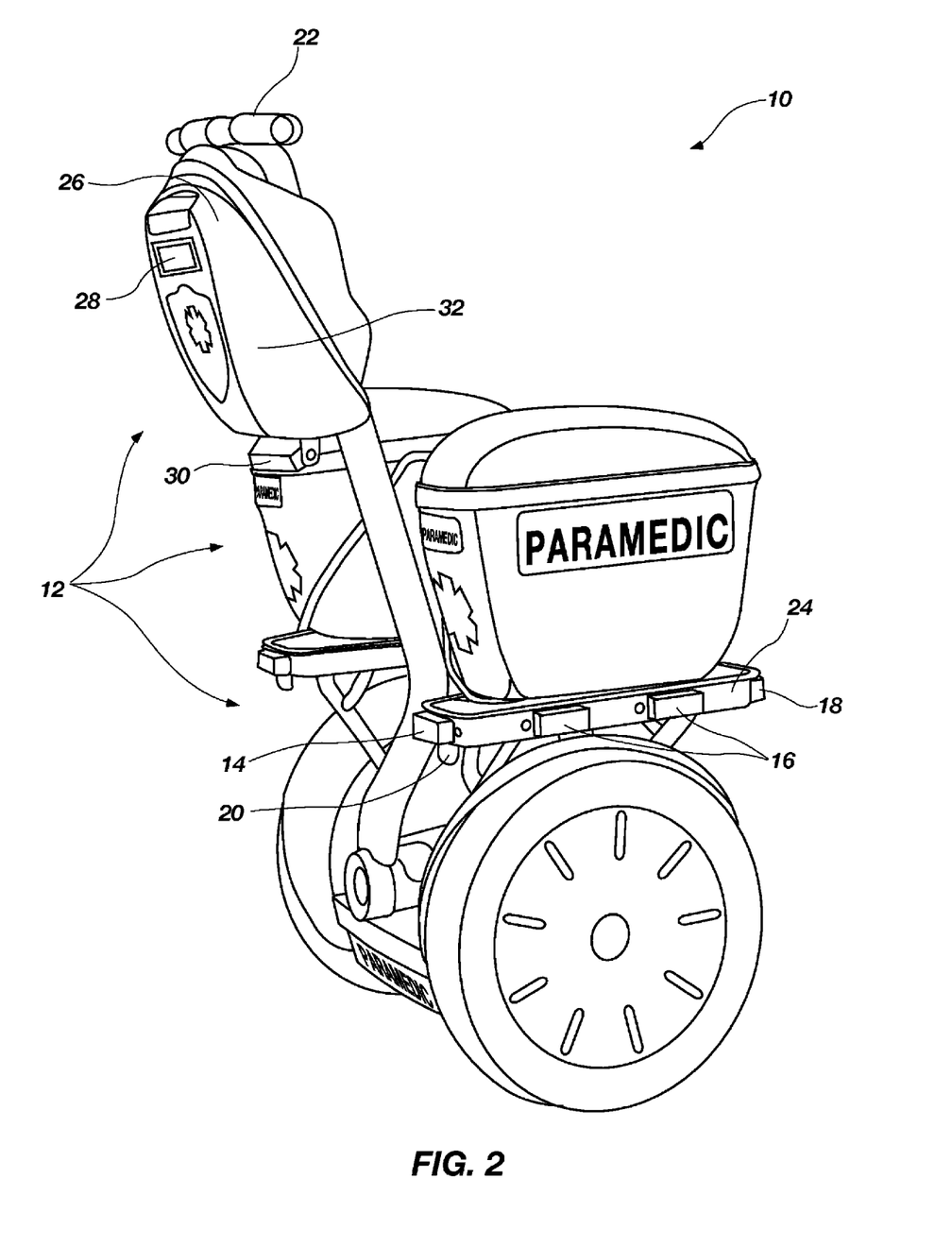
FIG. 2 is a perspective view of a personal transporter according to an illustrative embodiment of the present invention.

Illustrated in FIGS. 1 and 2 is a personal transporter 10 augmented with a system 12 of providing visual and audio alerts mounted thereon. An illustrative embodiment of the system 12 may comprise two light bars 13, each having a plurality of lights thereon. For example, the light bar 13 may comprise a bracket 24 for attaching an array of lights to the personal transporter 10. The light bar 13 may comprise a forward facing light 14 attached to said bracket 24 for attracting the attention of bystanders that may be generally in front of the personal transport 10. The light bar 13 may further comprise lateral or side facing lights 16 for attracting the attention of bystanders that are generally located to the side of the personal transport 10. The light bar 13 may comprise a rearward facing light 18 (see FIG. 4) for alerting those behind the personal transport 10. The system 12 may further include a secondary front light 20 disposed on the front of the personal transporter 10. In addition, the system 12 may comprise two side bags 15 for carrying cargo and supplies. The side bags 15 may each have reflective identifying decals 17 thereon. A side bag 15 may comprise an interior open space for accommodating cargo and allowing a greater number of uses for the personal transporter 10. A light housing 26 may also be disposed on the front of the personal transporter for providing visual and audio alerts for the personal transporter 10. The light housing 26 may comprise a head light 30 and a signal light 28. The housing 26 may further include an audio alert system 32 for producing audio alerts. The system 12 may also include a user control panel 22.

The user control panel 22 may be hardwired and electrically connected to the other components of the system. Alternatively, the user control panel may wirelessly communicate with a receiver that is configured to receive a wireless signal from a transmitter in the user control panel 22, and wherein the receiver is electronically connected to the remaining components. A user control panel 22 maybe configured to operate the lights in a predetermined pattern or a plurality of predetermined patterns. A user may be able to control all the functions of the system 12 with a remote control (not shown). In an illustrative embodiment, the user control panel 22 may be removable from the personal transporter 10 to be taken by the user and used from a distance.

Figure 3:
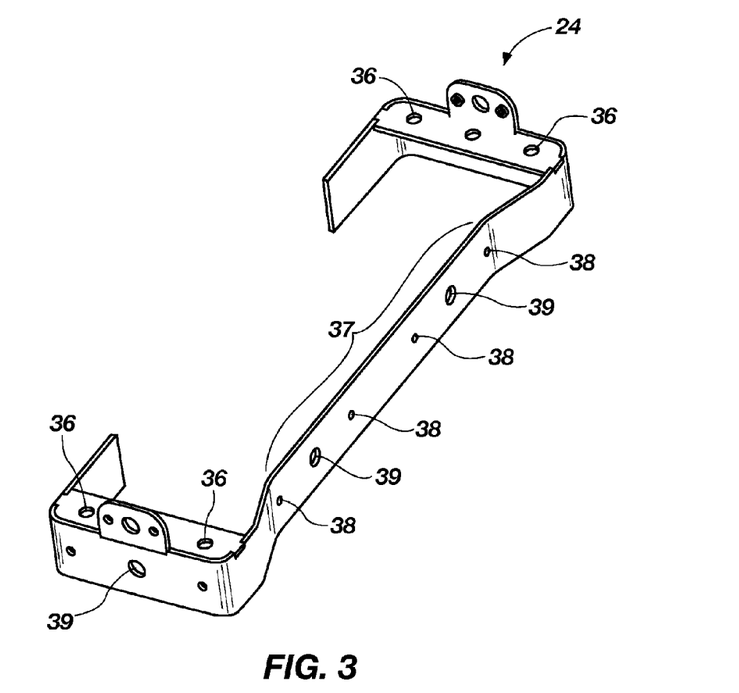
FIG. 3 is a perspective view of a bracket according to an illustrative embodiment of the present invention.

FIG. 3 shows a detailed view of an illustrative bracket 24 used for constructing a light bar 13. The bracket 24 is used for attaching lights to a personal transporter 10. For mounting the bracket 24 to a personal transporter 10 there are mount holes 36 provided therein. Fasteners may extending through these mount holes for attaching the bracket 24 to structure on the personal transporter. Examples of fasteners include screws, bolts, rivets, and the like. For attaching lights on to the bracket there are light mount holes 38 provided thereon. Other structures such as protrusions, for example, may be used in place of holes and are contemplated to be within the scope of this disclosure. Any manner of fixtures known in the art may be used for securing lights in the holes. Also provided on the bracket are openings 39 for accommodating wires therethrough so that the wiring for the lights may be hidden. The opening may also provide protection for the wiring so that the wiring is not exposed on the exterior of the bracket 24. Additionally, the light bar may comprise an indented portion 37 such that lights mounted therein do not protrude beyond the natural perimeter of the bracket 24.

Figure 4:
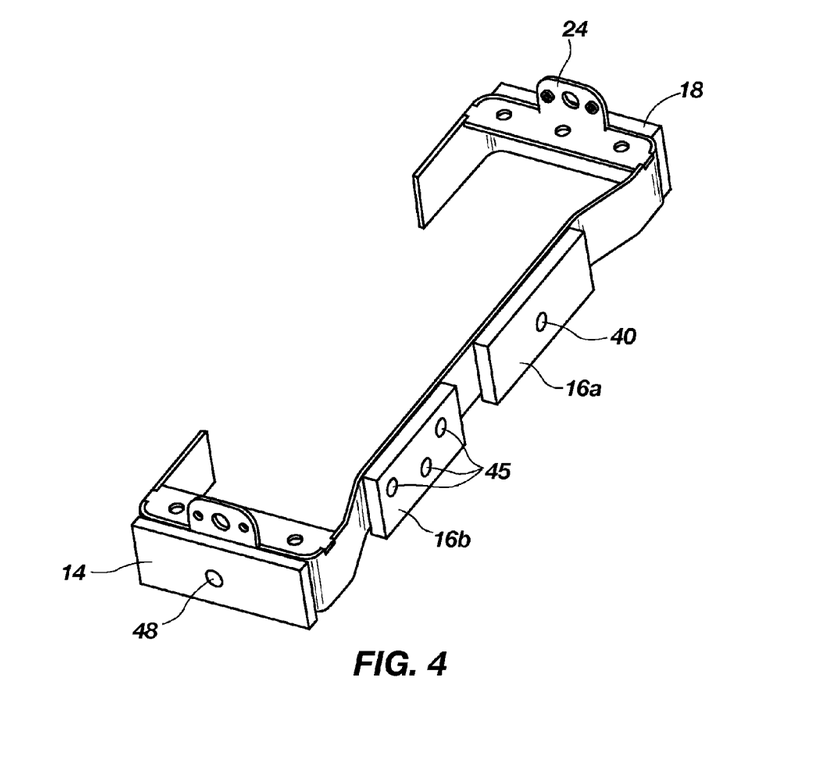
FIG. 4 is a perspective view of a light bar according to an illustrative embodiment of the present invention.

FIG. 4 shows a light bar 13 in greater detail with lights mounted thereon. The light bar 13 of the embodiment includes a forward facing light 14, side facing lights 16a, 16b, and a rear facing light 18 mounted on the bracket 24. The lights are mounted into their respective mount holes 38 (shown in FIG. 3). The mount holes 38 are not seen in FIG. 4 because the lights are covering them. The forward facing light 14 may be used for path illumination purposes, much like a head light, or the forward facing light may be used as a signal light. Any of the lights in the application may be white, colored, or multi colored. The forward facing light 14 may comprise a bulb type light or it may comprise a light emitting diode. As shown in the embodiment of FIG. 4, the forward facing light is a light emitting diode 48. The lights of the light bar 13 may also contain a side facing light 16b having a cluster 45 of bulbs or LEDs to function in unison and in concert to create more lighting options. For example a single light in the cluster 45 may be used in less demanding circumstances to conserve battery power. On the other hand when the circumstances demand, all the lights in the cluster 45 can be turned on for greater brilliance. A side facing light 16a may comprise a single light 40 wherein said single light may be of bulb type or of diode type. Light bar 24 may comprise a rearward facing light 18 having a single or plural number of lights therein. With the desired lights in place on the light bar 13 the light bar can be mounted to a personal transporter and electrically connected to a user control panel and power source for operation.

Electrical connectivity may come by way of a dedicated power source such as a battery for the alert system that does not share power with the personal transporter power source. In another embodiment, electrical connectivity may by achieved by accessing the battery of the personal transporter.

Figure 5:
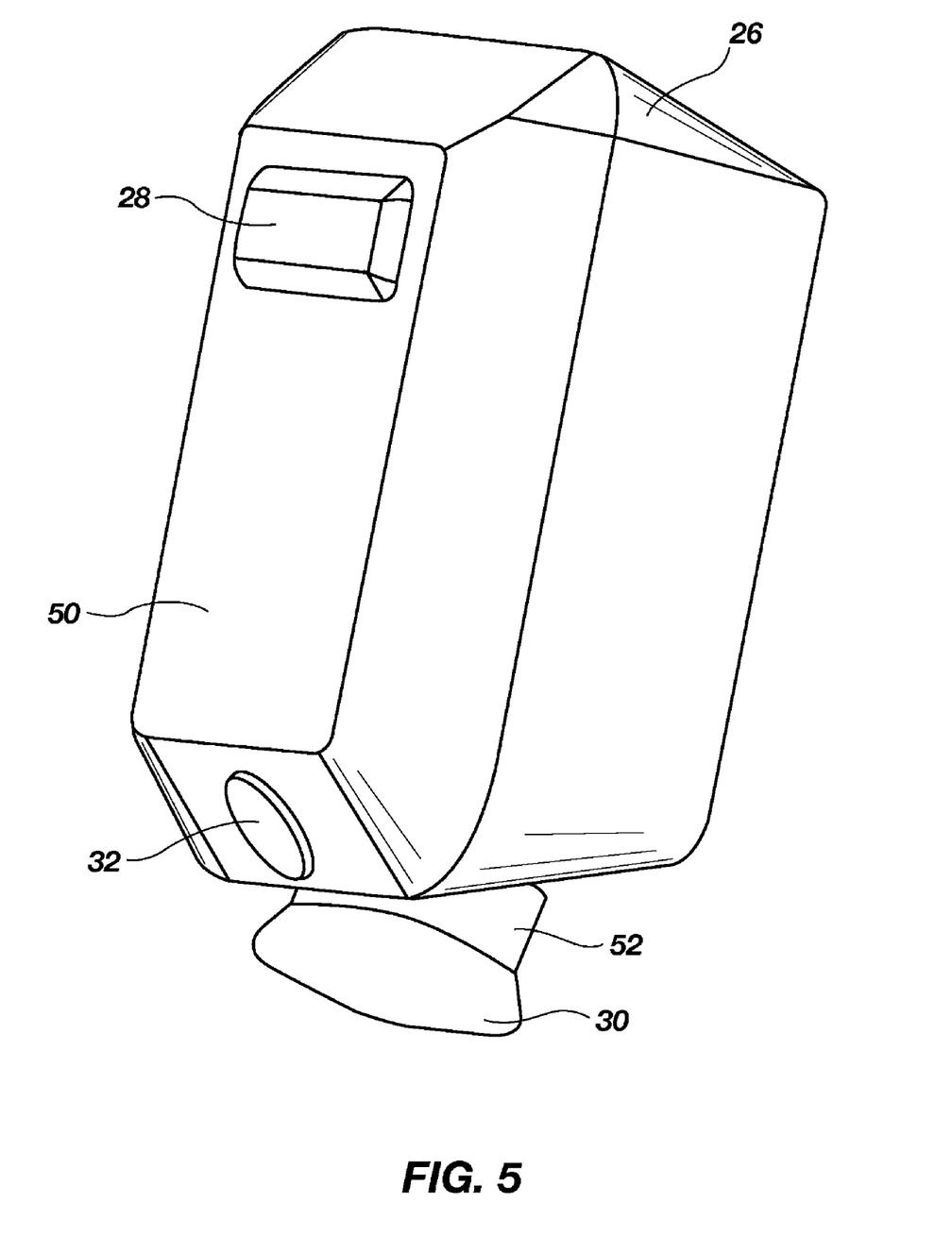
FIG. 5 is a perspective view of a light housing according to an illustrative embodiment of the present invention.

Referring to FIG. 5, a light bag housing 26 is shown in detail. The light bag housing 26 may comprise a signal light 28 mounted thereto for providing elevated signal light positioning for a signal light 28. The light bag housing 26 is generally mounted near the hand controls 29 (see FIG. 6) of the personal transporter 10, so it can be located relatively high when compared to the light bars 13 as discussed above. The signal light 28 may comprise a single light or plurality of lights. The bulbs or LEDs comprising the signal light 28 may be clustered together. The lights may be of bulb type and may be of LED type. Generally, LED type lights provide the advantage of very low power drain from the electrical system. This is important in a personal transporter because light and locomotion both use the available electrical power of the personal transporter. Thus, the more energy used for providing light, the less energy is available for locomotion. The converse is also true; the more energy used for providing locomotion, the less energy is available for providing light.

The light bag housing 26 may also comprise a headlight 30 that generally faces forward, and in the embodiment illustrated in FIG. 5 has an adjustable mount 52 for mounting the light to the light bag housing 26 and for allowing the headlight 30 to be adjusted vertically. The light bag housing 26 may also comprise an audio alert system 32. In an illustrative embodiment of the invention, the audio alert system 32 may be a siren, speaker, clicker, or any manner of audio alerting device. The light bag housing 26 may have a forward facing portion 50 made from hard material while the remainder of the housing may be pliant. The hard material facilitates the mounting of hardware thereon. The light bag housing may comprise a battery (not shown) that electrically activates the audio alert system 32, the headlight 30, and the signal light 28. The light bag may also be configured to be electrically connected to the power supply of the personal transporter to draw power therefrom. An illustrative embodiment of the invention may comprise a charging circuit and charging port so that the light bag housing 26 does not have to be removed from the personal transporter for charging. The light bag housing 26 may also include a user control panel (not shown) or be electrically connected to a user control panel. The user control panel may be hardwired and electrically connected to the other components of the system. Alternatively, the user control panel may wirelessly communicate with a receiver that is configured to receive a wireless signal from a transmitter in the user control panel, and wherein the receiver is electronically connected to the remaining components. A user control panel maybe configured to operate the lights in a predetermined pattern, or a plurality of predetermined patterns. A user may be able to control all the functions of the system with a remote control (not shown). In an illustrative embodiment, the user control panel may be removable from the personal transporter to be taken by the user and used from a distance.

Figure 6:
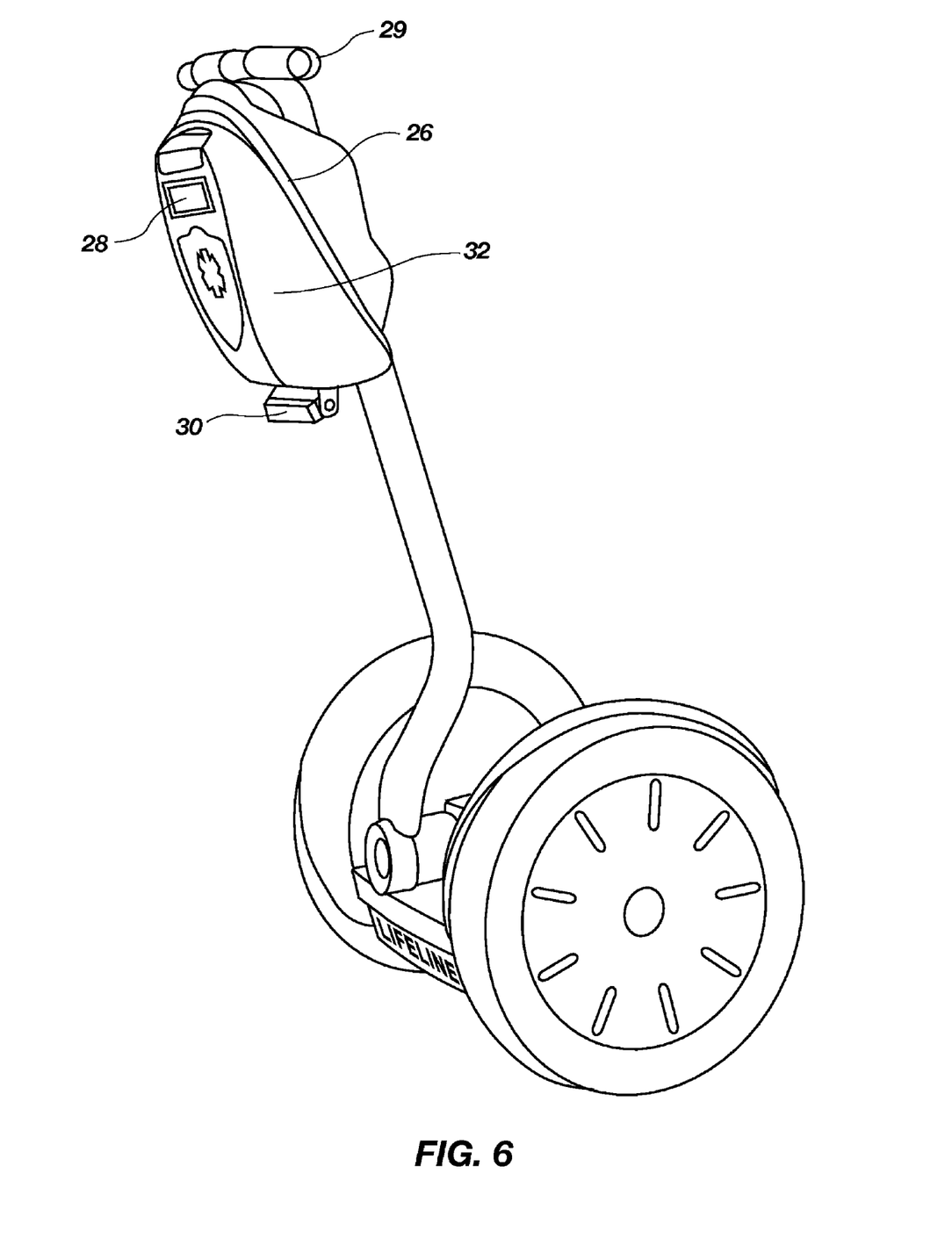
FIG. 6 is a perspective view of a light housing mounted on a personal transporter according to an illustrative embodiment of the present invention.

FIG. 6 shows an illustrative embodiment of the invention wherein the light bag housing 26 is mounted on a typical personal transporter. As can be seen in the figure, headlight 30, signal light 28, and audio alert system 32 can be seen relative to the placement of the light bag housing 26. FIG. 6 also illustrates a system for providing audio and visual alert functionality without the presence of any side bags or light bars.

Figure 7:
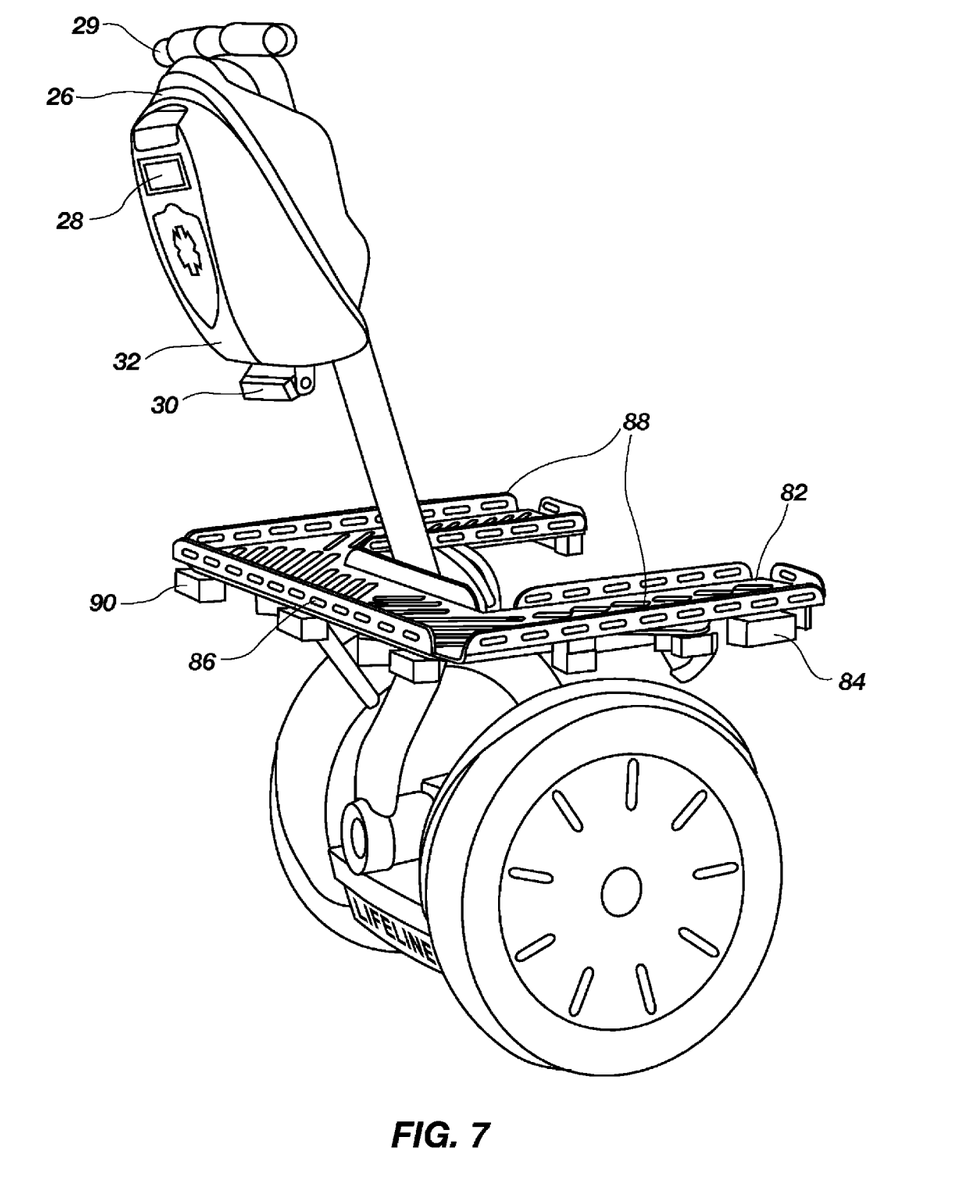
FIG. 7 is a perspective view of a light housing and a cargo tray mounted on a personal transporter according to an illustrative embodiment of the present invention.
Figure 8:
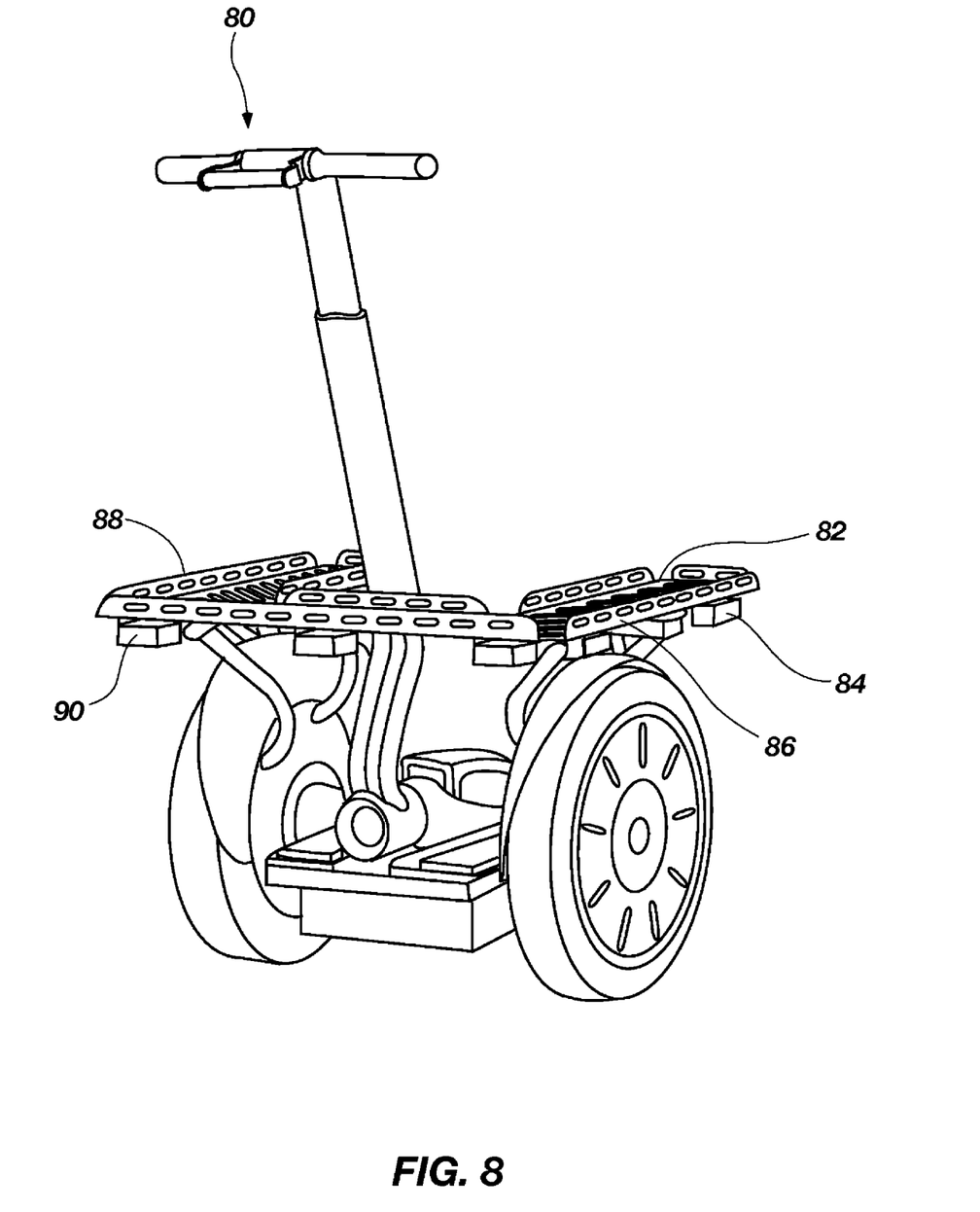
FIG. 8 is a perspective view of a cargo tray mounted on a personal transporter according to an illustrative embodiment of the present invention.

FIGS. 7-10 illustrate a system for providing visual and audio alerts for a personal transporter along with cargo carrying capacity. A light bag housing 26 having the features described above may be disposed near the hand controls 29 of the personal transporter, such as is shown in FIG. 7. Alternatively, the light bag housing 26 may be omitted, as shown in FIG. 8. In an illustrative embodiment of the present invention, the personal transporter may have a tray system 82 for providing a tray platform 83 having front 86 and side 88 vertically extending edges. The tray system 82 may further comprise a plurality of light bars 84 similar to those described above. Each of the light bars may have a bracket that has a work light disposed thereon. The light bars 84 or a plurality of light bars 84 may be disposed adjacent to said front and side edges of said tray platform.

FIG. 8 illustrates a personal transporter 80 with a tray system 82 for providing a substantially horizontal tray platform having front and side edges. The tray system 82 may further comprise a plurality of light bars 84 as described above. Each of the light bars may have a bracket that has a work light 90 disposed thereon. The light bars 84, or a plurality of light bars 84, may be disposed adjacent to said front and side edges of said tray platform.

Figure 9:
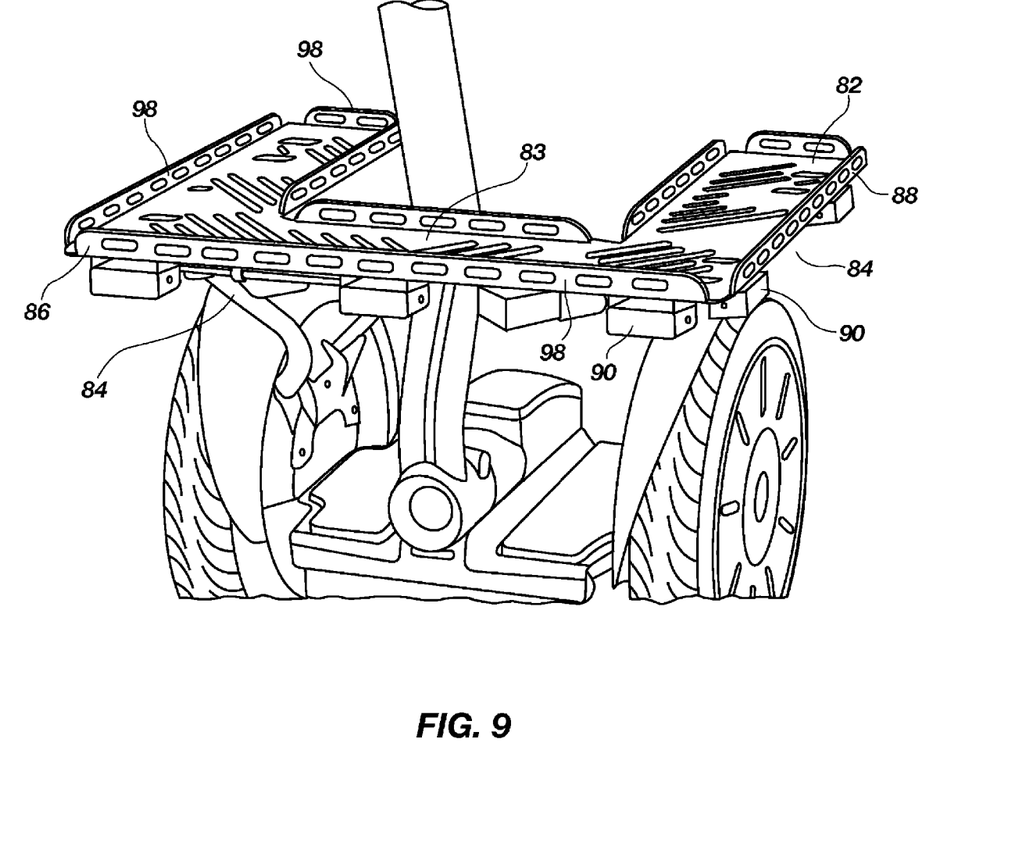
FIG. 9 is a front perspective view of a cargo tray mounted on a personal transporter according to an illustrative embodiment of the present invention.

FIG. 9 illustrates a more detailed view of the tray system 82. An embodiment of the tray system 82 may comprise upwardly directed protrusions 98 at the edges of the tray platform portion 83, such that items placed on the platform portion 83 can not readily fall off the platform 83 while maneuvering the personal transporter 80. The light bars 84 may be configured with work lights 90 in addition to signal lights, or the light bars 84 may only comprise work lights 90 allowing a user to see objects. The tray system 82 may include attachment structures for attaching to a personal transporter.

Figure 10:
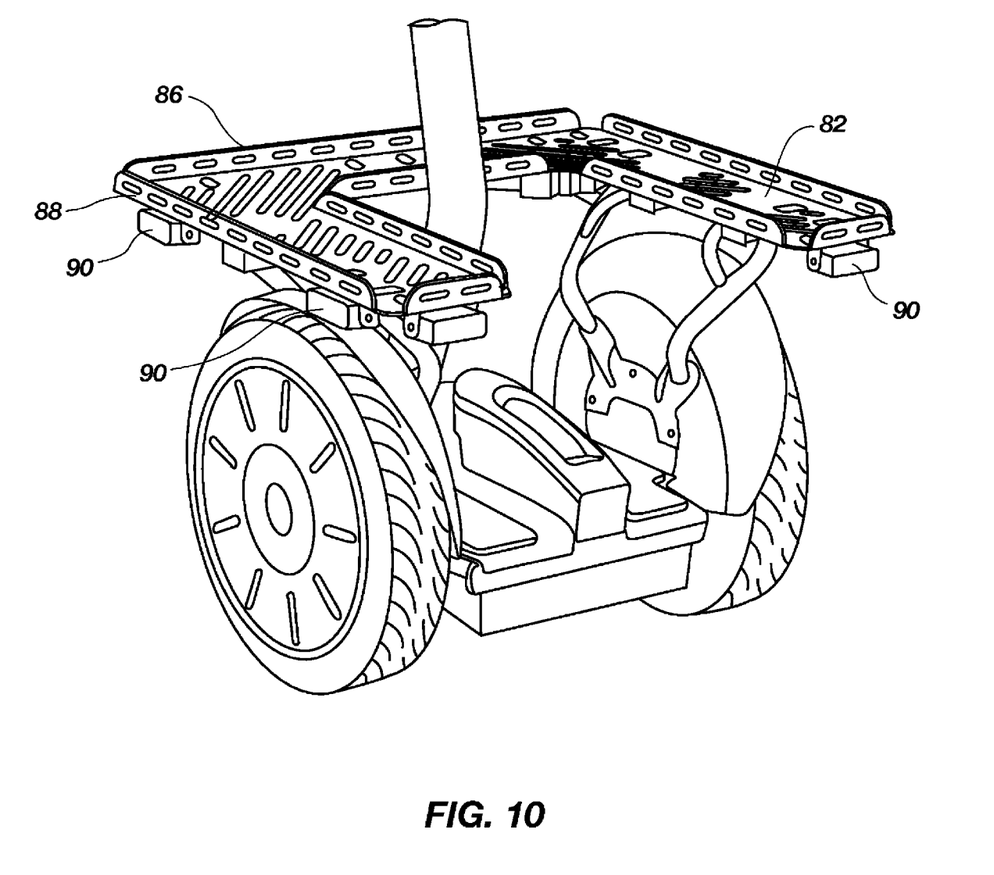
FIG. 10 is a rear perspective view of a cargo tray mounted on a personal transporter according to an illustrative embodiment of the present invention.

FIG. 10 illustrates a back view of a personal transporter having a tray system 82 and a light bar including a rearward facing work light 90 for illuminating objects behind the personal transporter. It can easily be seen that by using the tray system 82 and work lights 90 of this embodiment a user will have the ability carry tools and parts out to a location on the tray system 82 and work by the light of the work lights 90.

Figure 11:
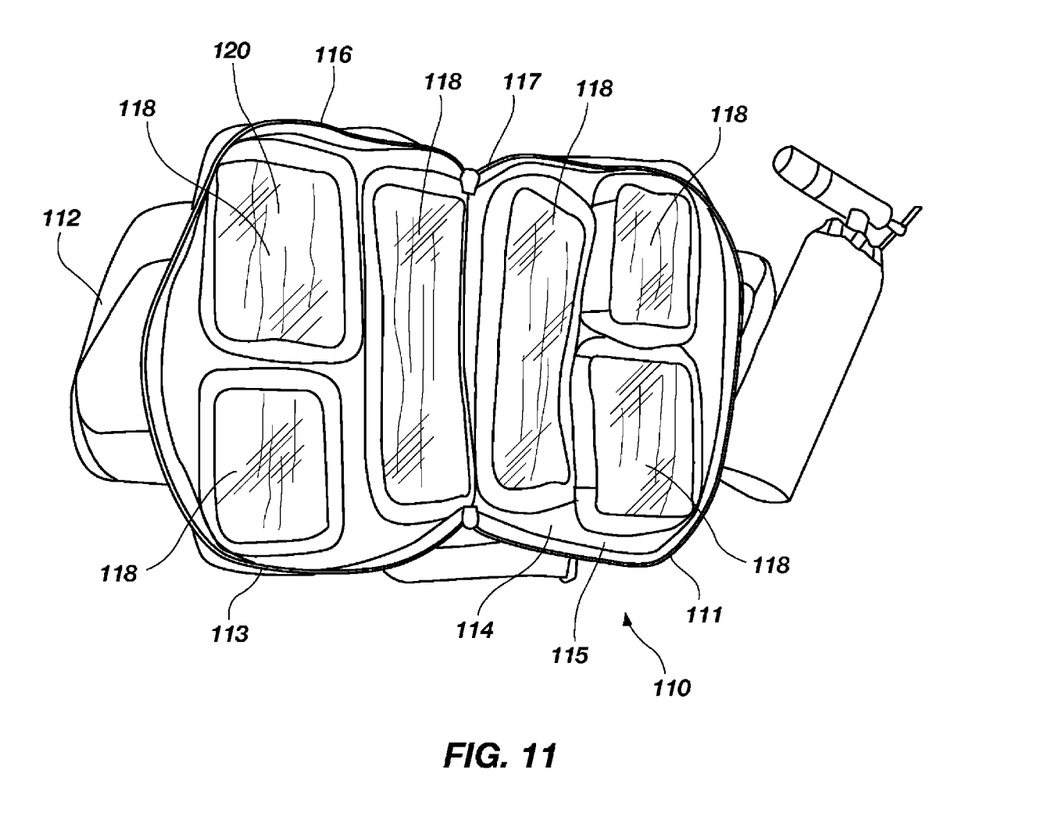
FIG. 11 shows a side bag organizer according to an illustrative embodiment of the present invention.

Illustrated in FIG. 11 is a side bag organizer 110 for organizing cargo containers or side bags on a personal transporter. The side bag organizer 110 comprises a housing 111 comprising a first portion 113 and a second portion 115 joined to each other by a flexible connector 117. The flexible connector 117 permits the first portion 113 and the second portion 115 to move in relation to each other while remaining joined. A zipper 116 is disposed on the first portion 113 and the second portion 115 to permit releasable sealing of the first portion 113 and the second portion 115 to each other along edges thereof. The housing 111 defines an inner compartment 114 comprising a space therein. The inner compartment 114 can be closed and sealed by the zipper 116. A plurality of containers 118 are configured to reside in the inner compartment 114 and hold various selected tools and supplies. The containers 118 may comprise a transparent portion 120 to aid a user in rapidly finding the supplies he needs. The container 118 may also be color coded for ease of use. The side bag organizer may further comprise a handle 112 to aid in its use. Locks may be disposed on the side bags 15 (for example, FIG. 1), housing 111, and containers 118 to achieve a triple lock system required under certain regulations for safeguarding certain materials that may be transported with the personal transporter when the personal transporter is unattended.

The publications and other reference materials referred to herein to describe the background of the disclosure, and to provide additional detail regarding its practice, are hereby incorporated by reference in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

It will be appreciated that the structure and apparatus disclosed herein are merely examples of embodiments for audio and visual alerts for personal transporters, It will be appreciated that the structure and apparatus disclosed herein are merely examples of embodiments for audio and visual alerts with work lights and a cargo tray for personal transporters, and it should be appreciated that any structure, apparatus or system for providing more usability for a personal transporter that performs functions the same as, or equivalent to, those disclosed herein are intended to fall within the scope of this disclosure, including those structures, apparatus or systems for providing alerts and additional cargo capacity which are presently known, or which may become available in the future. Anything which functions the same as, or equivalently to, for providing alerts and additional cargo capacity for a personal transporter falls within the scope of this element.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The subject matter claimed is:

1. A system for providing visual and audio alerts on a personal transporter, the system comprising:
   a light bar assembly disposed on the personal transporter, the light bar assembly comprising a bracket and a forward-facing light, a side-facing light, and a rear-facing light, wherein each of said forward-facing light, side-facing light, and rear-facing light is disposed on said bracket;
   a user control panel disposed on said personal transporter and electrically connected to said forward-facing, side-facing, and rear-facing lights;
   a light housing assembly disposed on said personal transporter and electrically connected to said user control panel, said light housing assembly having a head light, a signal light, and an audio alert system disposed thereon; and
   means for supplying electrical power to said user control panel, forward-facing light, side-facing light, rear-facing light, head light, signal light, and audio alert system.

2. The system of claim 1 wherein said user control panel comprises a wireless transmitter, and a wireless receiver that is electrically connected to said forward-facing light, side-facing light, rear-facing light, head light, signal light, and audio alert system.

3. The system of claim 1 wherein said user control panel is configured for activating said forward-facing light, side-facing light, and rear-facing light in one or more predetermined pattern.

4. The system of claim 1 wherein said forward-facing light is configured for emitting white light and said side-facing and rear-facing lights are configured for emitting colored light.

5. The system of claim 1 wherein said forward-facing light, side-facing light, rear-facing light, head light, and signal light comprise light emitting diodes.

6. The system of claim 5 wherein said light emitting diodes are configured for emitting a plurality of colors of light.

7. The system of claim 5 wherein said light emitting diodes are clustered into pluralities of light emitting diodes.

8. The system of claim 1 wherein said personal transporter comprises one or more side bags, further comprising a side bag organizer configured for being transported in said one or more side bags, said side bag organizer comprising:
   a housing comprising a first portion and a second portion joined to each other by a flexible connector, the housing defining an inner compartment;
   a zipper disposed on said first portion and said second portion for permitting releasable sealing of said inner compartment;
   at least one handle disposed on said first portion or said second portion or on both said first and second portions;
   at least one container sized and shaped to fit within said inner compartment, said at least one container further comprising a transparent portion for viewing contents of said container.

9. A system for providing light and cargo carrying capacity on a personal transporter, the system comprising:
   a tray system disposed on said personal transporter, the tray system comprising a tray platform comprising a substantially horizontal surface and further comprising front and side edges,
   a plurality of light bars, each comprising a bracket having a work light disposed thereon, said plurality of light bars disposed adjacent to said front and side edges of said tray platform;
   a user control panel disposed on said personal transporter and electrically connected to each said work light; and
   means for supplying electrical power to said user control panel and each said work light.

10. The system of claim 9 wherein said tray platform comprises a retainer wall disposed adjacent to said front and side edges.

11. The system of claim 9 further comprising:
    a light housing assembly disposed on said personal transporter, said light housing assembly having a head light, a signal light, and an audio alert system disposed thereon; and
    wherein said head light, said signal light, and said audio alert system are electrically connected to said user control panel and said means for supplying electrical power.

12. The system of claim 9 wherein said user control panel comprises a wireless transmitter, and a wireless receiver is electrically connected to each said work light.

13. The system of claim 9 wherein said plurality of work lights, said head light, and said signal light comprise light emitting diodes.

14. The system of claim 13 wherein said light emitting diodes are configured for emitting a plurality of colors of light.

15. The system of claim 13 wherein said light emitting diodes are clustered into pluralities of diodes.

16. A system for providing visual and audio alerts on a personal transporter, the system comprising:
- a light housing assembly disposed on said personal transporter, said light housing assembly having a head light, a signal light, and an audio alert system disposed thereon;
- a user control panel disposed on said personal transporter and electrically connected to said head light, said signal light, and said audio alert system; and
- means for supplying electrical power to said user control panel, head light, signal light, and audio alert system.

17. The system of claim 16 wherein said user control panel comprises a wireless transmitter, and a wireless receiver that is electrically connected to said head light, signal light, and audio alert system.

18. The system of claim 16 wherein said user control panel is configured for activating said signal light in one or more predetermined pattern.

19. The system of claim 16 wherein said forward-facing light is configured for emitting white light and said side-facing and rear-facing lights are configured for emitting colored light.

20. The system of claim 16 wherein said forward-facing light, side-facing light, rear-facing light, head light, and signal light comprise light emitting diodes.

21. The system of claim 20 wherein said light emitting diodes are configured for emitting a plurality of colors of light.

22. The system of claim 20 wherein said light emitting diodes are clustered into pluralities of diodes.

\* \* \* \* \*